United States Patent Office 3,560,502
Patented Feb. 2, 1971

3,560,502
NEW QUINAZOLINE COMPOUNDS AND METHODS FOR THEIR PRODUCTION
John Davoll, Shepperton, England, assignor to
Parke, Davis & Company, Detroit, Mich.
No Drawing. Filed May 24, 1968, Ser. No. 731,727
Claims priority, application Great Britain, May 25, 1967,
24,462/67
Int. Cl. C07d 51/48
U.S. Cl. 280—256.4                                   6 Claims

ABSTRACT OF THE DISCLOSURE 2,4-diamino - 6 - (substituted nitrosamino)quinazoline compounds and salts thereof. The substituent on the 6-nitrosamino group is a group such as benzyl, substituted benzyl, naphthylmethyl, furylmethyl, thienylmethyl, or pyridylmethyl. The compounds can also be substituted at the 5-position by chlorine or methyl and at the side-chain carbon atom adjacent to the nitrosamino group by lower alkyl. The compounds have pharmacological activities, primarily an antiparasitic and antimalarial agents.

SUMMARY AND DETAILED DESCRIPTION

The present invention relates to new quinazoline compounds. More particularly, the invention relates to new 2,4-diamino - 6 - (substituted nitrosamino)quinazoline compounds, to salts thereof, and to methods for the production of the foregoing compounds.

In the forms of their free bases, the compounds of the invention can be represented by the formula

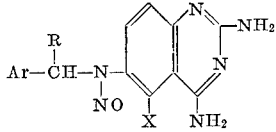

wherein R represents hydrogen or lower alkyl; X represents hydrogen, chlorine, or methyl; and Ar represents phenyl, naphthyl, furyl, thienyl, pyridyl, or phenyl substituted by one, two, or three substituents selected from among lower alkyl, lower alkoxy, and halogen. The lower alkyl and lower alkoxy groups are those containing not more than 4 carbon atoms and are preferably methyl and methoxy. The preferred halogens are chlorine and bromine and especially chlorine.

In accordance with the invention, the compounds of the foregoing formula and their salts can be produced by reacting a 2,4-diaminoquinazoline compound of the formula

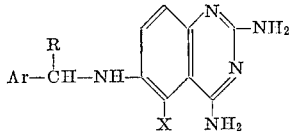

or an acid-addition salt thereof with a nitrosating agent; where R, X, and Ar are as defined before. Some examples of suitable nitrosating agents are nitrous anhydride ($N_2O_3$), nitrogen tetroxide ($N_2O_4$), nitrosyl borofluoride ($NOBF_4$), and nitrous acid (HONO). The preferred nitrosating agent is nitrous acid which is most conveniently generated in situ by the addition of an alkali metal nitrite to an acidified reaction mixture containing the 2,4-diaminoquinazoline starting material. Some examples of suitable solvents for the reaction are aqueous solutions of lower alkanoic acids such as acetic acid; lower alkanols such as methanol or ethanol; lower alkoxyethanols such as ethylene glycol monomethyl ether or ethylene glycol monoethyl ether; dimethylformamide; and mixtures of the above. A preferred solvent is dimethylformamide acidified with aqueous acetic acid. The reagents can be used in approximately equimolar quantities although it is customary to employ a moderate excess of the nitrosating agent. Greater excesses can be used but are unnecessary. The time and temperature of the reaction are not particularly critical except that high temperatures are avoided when mineral acids are present in the reaction mixture. In general the reaction is carried out at a temperature between 0 and 125° C. for from a few minutes to 24 hours, the longer reaction times being used at lower temperatures. Preferred conditions are to carry out the reaction at room temperature, about 20–25° C., for up to 18 hours. The product is isolated from an acidic reaction mixture directly as an acid-addition salt or, following treatment with a base, as the free base.

The 2,4 - diaminoquinazoline compounds required as starting materials in the foregoing process can be prepared by any of a variety of methods. Many of them have been described in British patent specification No. 1,045,180. In general, they can be prepared by reacting an aldehyde of the formula Ar—CHO or an acetal or ketal of the formula

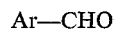

with an equimolar quantity of a 2,4,6-triaminoquinazoline of the formula

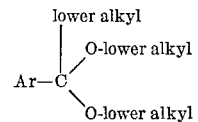

in an unreactive organic solvent, followed by reducing the resulting aralkylidene compound or Schiff base of the formula

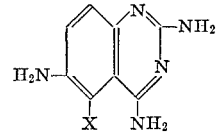

with sodium borohydride. The 2,4,6-triaminoquinazolines required in this procedure can be obtained by reducing the corresponding 2,4-diamino-6-nitroquinazolines; as for example, by reacting them with stannous chloride in hydrochloric acid, followed by treatment with base; or by hydrogenation in the presence of a palladium catalyst. In all these formulas R, X, and Ar are as defined before. Other methods of preparation, as described in British patent specification No. 1,045,180, can also be used.

The free bases of the invention form acid-addition salts with any of a variety of inorganic and organic acids. Pharmaceutically-acceptable acid-addition salts are formed with such acids as hydrochloric, hydrobromic, sulfuric, nitric, phosphoric, acetic, citric, tartaric, succinic, benzoic, salicyclic, maleic, malic, gluconic, ascorbic, and pamoic acids. The free bases and their salt forms are interconvertible by adjustment of the pH. They differ in solubility properties but in general are otherwise equivalent for the purposes of the invention.

The compounds of the invention are useful as pharmacological agents and as chemical intermediates. They are antiparasitic and especially antimalarial agents. A preferred compound of the invention is 2,4-diamino-6-[(3,4-dichlorobenzyl)nitrosamino]quinazoline, which exhibits an exceptionally high order of antimalarial potency. The antimalarial potency of this and other compounds of the invention can be quantitatively measured in standard assay procedures using *Plasmodium berghei* and *Plasmodium cynomolgi* infections. Extended studies have shown that this compound is fully effective against chloroquine-resistant *Plasmodium berghei*, shows some cross-resistance with sulfones and cycloguanil pamoate or pyrimethamine, but still is quite effective against malaria parasites that are sulfone- or cycloguanil-resistant. Co-administration of this compound with sulfadiazine has shown enhanced activity against *Plasmodium berghei*. This behavior is representative of synergistic action against malarial parasites shown by the compounds of the invention in combination with antimalarial sulfonamides and sulfones. The compounds of the invention are also suppressive against *Trypanosoma cruzi*, the causative organism of Chagas' disease; and are antibacterial agents. For example, 2,4-diamino-6-(benzylnitrosamino)quinazoline has been found active against *Streptococcus pyogenes, Staphylococcus aureus, Diplococcus pneumoniae,* and *Escherichia coli*; and 2,4-diamino-6-[o-chlorobenzyl)nitrosamino]quinazoline has been found active against *Streptococcus pyogenes, Staphylococcus aureus, Escherichia coli,* and *Salmonella typhimurium*. The compounds of the invention can be used in either free form or in acid-addition salt forms. They are active on either oral or parenteral administration, and in general oral administration is preferred.

The invention is illustrated by the following examples.

EXAMPLE 1

A solution is prepared by dissolving 2.65 g. of 2,4-diamino-6-benzylaminoquinazoline in 10 ml. of cold dimethylformamide. With stirring, there are added to this solution 10 ml. of 50% aqueous acetic acid and then a solution of 0.76 g. of sodium nitrite in 5 ml. of water. The resulting reaction mixture contains nitrous acid generated in situ. It is stirred vigorously to ensure thorough mixing and then allowed to stand at room temperature. The reaction product, 2,4-diamino-6-(benzylnitrosamino)quinazoline acetate, begins to separate from the solution in a short time; and after 18 hours it is collected on a filter. In order to obtain the free base the acetate salt is dissolved in boiling 50% aqueous ethanol, basified with concentrated aqueous ammonia. The solution is treated with charcoal, filtered and chilled. The product which separates, 2,4-diamino-6-(benzylnitrosamino)quinazoline, is collected on a filter; M.P. 159–161° C.

EXAMPLE 2

A solution of 8.99 g. of 2,4-diamino-6-(o-chlorobenzylamino)quinazoline in 50 ml. of dimethylformamide is treated first with 90 ml. of 50% aqueous acetic acid and then with a solution of 2.30 g. of sodium nitrite in 15 ml. of water. The solution is stirred vigorously, then basified with concentrated aqueous ammonia and diluted with water. After separation of the insoluble product, 2,4-diamino-6-[(o-chlorobenzyl)nitrosamino]quinazoline, is complete, it is collected on a filter. For purification the product is dissolved in 200 ml. of hot ethanol and the solution is stirred with charcoal, filtered and diluted with water to induce crystallization. The product is collected and crystallized again from aqueous ethanol; M.P. 180–182° C.

EXAMPLE 3

A solution of 4.60 g. of 2,4-diamino-6-(m-chlorobenzylamino)quinazoline in 30 ml. of dimethylformamide is treated first with 45 ml. of 50% aqueous acetic acid and then with a solution of 1.17 g. of sodium nitrite in 7 ml. of water. The solution is stirred vigorously and then basified with concentrated aqueous ammonia and diluted with water. The insoluble product, 2,4-diamino-6-[(m-chlorobenzyl)nitrosamino]quinazoline, is collected on a filter. For purification the product is dissolved in 100 ml. of ethanol containing 3 ml. of acetic acid. The solution is stirred with charcoal, filtered, basified with concentrated aqueous ammonia, diluted with water and chilled to induce crystallization. The product is collected and recrystallized a second time in the same manner; M.P. 175–176° C.

EXAMPLE 4

A solution of 7.37 g. of 2,4-diamino-6-(p-chlorobenzylamino)quinazoline in 80 ml. of dimethylformamide is treated first with 80 ml. of 50% aqueous acetic acid and then with a solution of 1.8 g. of sodium nitrite in 90 ml. of water. The solution is stirred vigorously and then chilled to 0° C. The precipitated acetate salt is collected and dissolved in a solution of 4 ml. of acetic acid in 120 ml. of hot ethanol. The solution is treated with charcoal, filtered and basified with concentrated aqueous ammonia. The insoluble product, 2,4-diamino-6-[(p-chlorobenzyl)nitrosamino]quinazoline, is collected on a filter. For further purification it is recrystallized from ethanol in the same manner; M.P. 140–142° C.

EXAMPLE 5

A solution of 8.38 g. of 2,4-diamino-6-(m-methylbenzylamino)quinazoline in 90 ml. of dimethylformamide is treated first with 90 ml. of 50% aqueous acetic acid and then with a solution of 2.30 g. of sodium nitrite in 15 ml. of water. This solution is stirred vigorously and then diluted by adding crushed ice. The insoluble product, 2,4-diamino-6-[(m-methylbenzyl)nitrosamino]quinazoline acetate, is collected on a filter. In order to obtain the free base the acetate salt is dissolved in a solution of 100 ml. of hot ethanol and 3 ml. of acetic acid. The solution is stirred with charcoal, filtered and basified with concentrated aqueous ammonia. The precipitated product, 2,4-diamino-6-[(m-methylbenzyl)nitrosamino]quinazoline, is collected on a filter. It has M.P. 174–176° C. after another crystallization from ethanol in the same manner.

EXAMPLE 6

A suspension of 3.45 g. of 2,4-diamino-6-(p-methylbenzylamino)quinazoline in 40 ml. of dimethylformamide is treated first with 40 ml. of 50% aqueous acetic acid and then with a solution of 0.95 g. of sodium nitrite in 7 ml. of water. The mixture is stirred vigorously and then diluted with crushed ice and basified with concentrated aqueous ammonia. The insoluble product, 2,4-diamino-6-[(p-methylbenzyl)nitrosamino]quinazoline, is collected on a filter. For purification it is dissolved in a hot solution of 3 ml. of acetic acid in 100 ml. of 50% ethanol. The solution is stirred with charcoal, filtered, basified with concentrated aqueous ammonia, diluted with 20 ml. of water and chilled to 0° C. until separation of the product is complete. The product is collected on a filter; M.P. 179–181° C.

EXAMPLE 7

A suspension of 2.95 g. of 2,4-diamino-6-(p-methoxybenzylamino)quinazoline in 30 ml. of dimethylformamide is treated first with 30 ml. of 50% aqueous acetic acid and then with a solution of 0.77 g. of sodium nitrite in 5 ml. of water. The mixture is stirred vigorously, diluted with crushed ice and basified with concentrated aqueous ammonia. The insoluble product, 2,4-diamino-6-[(p-methoxybenzyl)nitrosamino]quinazoline, is collected on a filter. For purification it is dissolved in a hot solution of 2 ml. of acetic acid in 80 ml. of ethanol. The solution is stirred with charcoal, filtered, basified with concentrated aqueous ammonia, and diluted with water until separation of the product is complete. The product is collected on a filter; M.P. 188–189° C.

EXAMPLE 8

A suspension of 11.7 g. of 2,4-diamino-6-[(3,4-dichlorobenzyl)amino]quinazoline in 120 ml. of dimethylformamide is treated first with 120 ml. of 50% aqueous acetic acid and then with a solution of 2.66 g. of sodium nitrite in 17 ml. of water. The mixture is stirred vigorously and then diluted with 120 ml. of water and cooled. After 18 hours the insoluble product is collected on a filter. It is the acetate salt of 2,4-diamino-6-[(3,4-dichlorobenzyl)nitrosamino]quinazoline; M.P. 172.5–174° C. following crystallization from ethanol using a charcoal treatment.

The free base is obtained by dissolving 10.23 g. of the acetate salt in 200 ml. of boiling ethanol and making the solution basic with concentrated aqueous ammonia. The mixture is cooled and the product collected on a filter. It is 2,4-diamino-6-[(3,4-dichlorobenzyl)nitrosamino]quinazoline; M.P. 200° C.

The acetate salt described above, 20 g., is dissolved at 90–100° C. in 440 ml. of a solvent mixture containing equal parts by volume of anhydrous ethanol and methyl ethyl ketone. With stirring, a solution of 11 g. of disodium pamoate monohydrate in 200 ml. of water is added. The mixture is cooled and the insoluble product is collected on a filter, washed with water, and dried. It is the salt of 2,4-diamino-6-[(3,4-dichlorobenzyl)nitrosamino]quinazoline with ½ formula weight pamoic acid; M.P. indefinite above 170° C.

A solution is prepared by dissolving 5 g. of 2,4-diamino-6 - [(3,4 - dichlorobenzyl)nitrosamino]quinazoline (free base) in a mixture of 800 ml. of anhydrous ethanol and 10 ml. of methyl ethyl ketone at 90–100° C. With stirring, a solution of 1 g. of citric acid in 10 ml. of anhydrous ethanol is added. The mixture is cooled and the insoluble product is collected on a filter, washed with anhydrous ethanol, and dried. It is the salt of 2,4-diamino-6-[(3,4-dichlorobenzyl)nitrosamino]quinazoline with ½ formula weight citric acid; M.P. indefinite above 163° C.

EXAMPLE 9

A suspension of 3.07 g. of 2,4-diamino-6-[(2,4,6-trimethylbenzyl)amino]quinazoline in 30 ml. of dimethylformamide is treated first with 30 ml. of 50% acetic acid and then with a solution of 0.77 g. of sodium nitrite in 5 ml. of water. The mixture is stirred vigorously, allowed to stand for 16 hours, diluted with crushed ice, basified with concentrated aqueous ammonia, and chilled to 0° C. The insoluble product, 2,4-diamino-6-[(2,4,6-trimethylbenzyl)nitrosamino]quinazoline, is collected on a filter. For purification it is dissolved in a solution of 1 ml. of acetic acid in 150 ml. of hot ethanol. The solution is treated with charcoal, filtered, and basified with concentrated aqueous ammonia. The precipitated product is collected on a filter; M.P. 205–207° C.

EXAMPLE 10

A solution of 2.45 g. of 2,4-diamino-6-benzylamino-5-methylquinazoline in 27 ml. of dimethylformamide is treated first with 27 ml. of 50% aqueous acetic acid and then with a solution of 0.69 g. of sodium nitrite in 5 ml. of water. The solution is shaken for a few minutes, stirred with ice, made basic with concentrated aqueous ammonia, and chilled to 0° C. The insoluble product, 2,4-diamino-6-(benzylnitrosamino) - 5 - methylquinazoline, is collected on a filter. The compound is purified by dissolving it in 60 ml. of hot ethanol containing a few drops of acetic acid, stirring with charcoal, filtering, adding concentrated aqueous ammonia, and collecting the insoluble product; M.P. 202–204° C.

The starting material can be obtained as follows. With stirring, 60 g. of 2-methyl-6-chlorobenzonitrile is added in portions at −15 to −10° C. to 300 ml. of fuming nitric acid (specific gravity=1.5). The mixture is allowed to stand for 24 hours at room temperature, and is then added, with stirring, to 4.5 liters of ice water. The solid which separates, 2-methyl-3-nitro-6-chlorobenzonitrile, is collected and recrystallized from aqueous ethanol; M.P. 75–80° C. A mixture of 20 g. of the latter product, 38 g. of guanidine carbonate and 1.0 liter of ethylene glycol monoethyl ether is heated at reflux for 3½ hours. The solution is evaporated at reduced pressure and the residue triturated with 200 ml. of water. The crude 2,4-diamino-5-methyl-6-nitroquinazoline is collected by filtration and dissolved in 200 ml. of hot 80% aqueous acetic acid. The solution is filtered, diluted with 30 ml. of 6 N aqueous ammonia and chilled to crystallize the acetate salt of 2,4-diamino-5-methyl-6-nitroquinazoline; M.P. 288° C. with decomposition. A mixture of 9.0 g. of this product, 500 ml. of ethanol, and 1.0 g. of 10% palladium on charcoal catalyst is shaken at 45° C. with hydrogen at atmospheric pressure until hydrogen uptake ceases. The mixture is filtered and the filtrate concentrated to a volume of 50 ml. and chilled to crystallize the free base product, 2,4,6-triamino-5-methylquinazoline; M.P. 220–222° C. A solution of 2.5 g. of 2,4,6-triamino-5-methylquinazoline and 1.41 g. of benzaldehyde in 20 ml. of ethylene glycol monoethyl ether is heated at reflux for 3 hours. The resulting mixture containing a benzylidene compound is then hydrogenated in 600 ml. of ethanol at 100° C. at a hydrogen pressure of 65 atmospheres using Raney nickel catalyst. The mixture is cooled, filtered to remove catalyst, and evaporated at reduced pressure to give the free base product, 2,4-diamino-6-benzylamino-5-methylquinazoline; M.P. 191–195° C.

EXAMPLE 11

A suspension of 0.84 g. of 2,4-diamino-5-chloro-6-[(3,4-dichlorobenzyl)amino]quinazoline in 7 ml. of dimethylformamide is treated first with 7 ml. of 50% aqueous acetic acid and then with a solution of 0.18 g. of sodium nitrite in 2 ml. of water. The mixture is stirred vigorously for a few minutes and the pH adjusted to 5 with aqueous ammonia. The mixture is cooled and the insoluble product collected on a filter. It is the acetate salt of 2,4-diamino-5-chloro - 6 - [(3,4-dichlorobenzyl)nitrosamino]quinazoline. For purification and conversion to the free base, it is dissolved in 20 ml. of ethanol containing a few drops of acetic acid. The solution is treated with charcoal, filtered, basified with aqueous ammonia, and diluted with 20 ml. of water. The purified product (free base) is recovered by filtration; M.P. 161–164° C.

The starting material can be obtained as follows. A mixture of 37 g. of 2-amino-6-chlorobenzonitrile and 34.3 g. of cyanamide dihydrochloride in 240 ml. of diethylene glycol dimethyl ether is stirred and heated at 145–150° C. for 2½ hours. The mixture is cooled, diluted with 700 ml. of ether and the precipitated crude product, 2,4-diamino-5-chloroquinazoline hydrochloride, is collected and powdered. The crude product is stirred with 2.5 liters of boiling water; the mixture is basified with aqueous ammonia, treated with charcoal and filtered. The hot filtrate is chilled and the crystalline product, 2,4-diamino-5-chloroquinazoline, removed by filtration. After recrystallization from water the product melts at 183–185° C. To a stirred mixture of 270 ml. of fuming nitric acid (specific gravity=1.5) and 270 ml. of concentrated sulfuric acid is added in portions, over a 2½ hour period, 50 g. of 2,4-diamino-5-chloroquinazoline, while keeping the temperature below 20° C. The resulting solution is allowed to stand for 18 hours, then poured onto 3 kg. of crushed ice. The mixture is basified with concentrated aqueous ammonia while adding ice to maintain the temperature below 40° C. The product which separates, 2,4-diamino-5-chloro-6-nitroquinazoline, is collected, washed with water and dried. This product, 22.1 g., is added below 30° C. to a stirred solution of 65 g. of stannous chloride dihydrate in 350 ml. of concentrated hydrochloric acid and 92 ml. of acetic acid. The mixture is stirred 18 hours at 20° C. The resulting precipitate is collected by filtration, washed with minimum amounts of concentrated hydrochloric acid and water, and then suspended in ice water. The mixture is basified with 40% aqueous sodium hydroxide while adding ice to maintain the temperature below 40° C. The solid free base product, hydrated 2,4,6-triamino-5-chloroquinazoline, is collected, washed with water and dried; M.P. 200–203° C. after recrystallization from water following charcoal treatment. A solution of 18.6 g. of 2,4,6-triamino-5-chloroquinazoline and 17.5 g. of 3,4-dichlorobenzaldehyde in 200 ml. of ethanol is heated at reflux for 2 hours. The resulting solution containing the 3,4-dichlorobenzylidene compound is cooled. There is then added, with stirring, a solution of 9.9 g. of sodium borohydride in 150 ml. of methanol at 0–5° C. After one-half hour, the mixture is heated to boiling, then allowed to cool. The precipitated product, 2,4-diamino-5-chloro - 6 - [(3,4-dichlorobenzyl)amino]quinazoline, is collected and recrystallized from aqueous ethanol; M.P. 218–220° C.

EXAMPLE 12

A suspension of 2.09 g. of 2,4-diamino-6-[(α-methylbenzyl)amino]quinazoline in 7.5 ml. of dimethylformamide is treated first with 7.5 ml. of 50% aqueous acetic acid and then with a solution of 0.57 g. of sodium nitrite in 4 ml. of water. The mixture is stirred for 10 minutes and the resulting clear solution is allowed to stand at room temperature. After 16 hours the crystalline precipitate is collected. Following crystallization from ethanol containing 10% acetic acid, it is obtained as a hydrated salt of 2,4-diamino-6-[(α-methylbenzyl)amino]quinazoline with 1½ formula weights acetic acid; M.P. 134–136° C. The free base is obtained by basifying a solution of the salt in ethanol, diluting with water, and collecting the precipitated product.

The starting material can be obtained as follows. A solution of 14 g. of 2,4,6-triaminoquinazoline and 15.5 g. of acetophenone diethyl acetal (also known as acetophenone diethyl ketal) in 80 ml. of diethylene glycol dimethyl ether is heated at the reflux temperature for 4½ hours. The ethanol formed in the reaction is continuously removed by distillation. The solution is filtered and cooled, 80 ml. of ether is added, and the product which separates, 2,4-diamino-6-[(α-methylbenzylidene)amino]quinazoline, is collected; M.P. 219–221° C. after recrystallization from ethanol. A suspension of 9.15 g. of this product in 300 ml. of ethanol is hydrogenated at 40° C. with platinum oxide catalyst for 8 hours. The mixture is filtered to remove catalyst, evaporated at reduced pressure to 60 ml., and diluted with 150 ml. of water to give the product, hydrated 2,4-diamino - 6 - [(α-methylbenzyl)amino]quinazoline; M.P. 200–202° C. after crystallization from aqueous ethanol.

EXAMPLE 13

A solution of 3.15 g. of 2,4-diamino-6-(2-naphthylmethylamino)quinazoline in 30 ml. of dimethylformamide is treated first with 30 ml. of 50% aqueous acetic acid and then with a solution of 0.77 g. of sodium nitrite in 5 ml. of water. The mixture is stirred vigorously and allowed to stand for 16 hours. The insoluble product is collected on a filter. For purification it is dissolved in a solution of 3 ml. of acetic acid in 80 ml. of hot ethanol and the solution is made basic with aqueous ammonia and cooled. The precipitate of 2,4-diamino-6-[(2-naphthylmethyl)nitrosamino]quinazoline is collected and crystallized a second time in the same manner; M.P. 176–179° C.

EXAMPLE 14

A solution of 4.00 g. of 2,4-diamino-6-(furfurylamino)quinazoline in 50 ml. of dimethylformamide is treated first with 50 ml. of 50% aqueous acetic acid and then with a solution of 1.20 g. of sodium nitrite in 8 ml. of water. The solution is stirred vigorously, cooled, and adjusted to pH 5 with concentrated aqueous ammonia. The precipitate of the acetate salt of 2,4-diamino-6-(furfurylnitrosamino)quinazoline is collected; M.P. 149–150° C. The acetate salt is dissolved in a solution of 1 ml. of acetic acid in 50 ml. of hot ethanol. The solution is treated with charcoal, filtered, and added with stirring to an excess of 6 N aqueous ammonia and crushed ice. The resulting precipitate of 2,4-diamino - 6 - (furfurylnitrosamino)quinazoline is collected; M.P. 159–160° C.

EXAMPLE 15

A mixture is prepared by suspending 2.71 g. of 2,4-diamino-6-(2-thenylamino)quinazoline in 10 ml. of dimethylformamide. The starting material can also be identified by the name 2,4-diamino-6-(2-thienylmethylamino)quinazoline. With stirring, there are added to this mixture 10 ml. of 50% aqueous acetic acid followed by a solution of 0.76 g. of sodium nitrite in 5 ml. of water. The mixture is stirred vigorously for a few minutes, allowed to stand at room temperature for 18 hours, and diluted with 10 ml. of water. The solution is clarified by filtration and the filtrate basified with concentrated aqueous ammonia. The insoluble precipitate of 2,4-diamino-6-(2-thenylnitrosamino)quinazoline, hydrated, is collected on a filter. The product can also be identified by the name 2,4-diamino-6-[(2-thienylmethyl)nitrosamino]quinazoline. After two crystallizations from aqueous ethanol, the product sinters at 124° C. and decomposes at 160–175° C.

The starting material can be obtained as follows. A solution of 11.2 g. of 2-thiophenecarboxaldehyde and 17.5 g. of 2,4,6-triaminoquinazoline in 150 ml. of ethylene glycol monoethyl ether is heated at reflux for 2 hours. The solution is cooled and treated at 0° C. with a solution of 10.8 g. of sodium borohydride in 500 ml. of methanol. The solution is heated at reflux for 1 hour, treated with an additional 5.4 g. of sodium borohydride, then heated at reflux for 15 minutes. The solution is stirred with charcoal, filtered, and evaporated to a paste. The paste is triturated with 1.0 liter of 0.5 N aqueous sodium hydroxide and the solid product collected by filtration. The product is dissolved in cold 2 N hydrochloric acid. This solution is washed with ether and then basified with aqueous sodium hydroxide to precipitate 2,4-diamino-6-(2-thenylamino)quinazoline; M.P. 227–229° C. after crystallization from aqueous ethanol.

EXAMPLE 16

A suspension of 2.09 g. of 2,4-diamino-6-(2-pyridylmethylamino)quinazoline in 25 ml. of dimethylformamide is treated first with 25 ml. of 50% aqueous acetic acid and then with 0.55 g. of sodium nitrite in 5 ml. of water. The mixture is stirred vigorously, then treated with ice and adjusted to pH 5 with concentrated aqueous ammonia. The precipiate is collected and dissolved in a solution of 1 ml. of acetic acid in 50 ml. of hot ethanol. The solution is stirred with charcoal, filtered, and basified with concentrated aqueous ammonia to precipitate 2,4-diamino-6 - [(2 - pyridylmethyl)nitrosamino]quinazoline; M.P. 177–179° C.

What is claimed is:

1. A member of the class consisting of 2,4-diamino-6-(substituted nitrosamino)quinazoline compounds of the formula

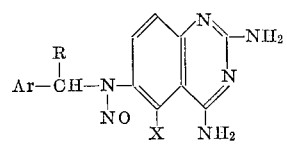

and pharmaceutically-acceptable acid-addition salts thereof; where R is a member of the class consisting of hydrogen and lower alkyl; X is a member of the class consisting of hydrogen, chlorine, and methyl; and Ar is a member of the class consisting of (a) phenyl, (b) naphthyl, (c) furyl, (d) thienyl, (e) pyridyl, and (f) phenyl substituted by one, two, or three substituents selected from among lower alkyl, lower alkoxy, and halogen.

2. A compound according to claim 1 which is 2,4-diamino-6-[(o-chlorobenzyl)nitroasamino]quinazoline.

3. A compound according to claim 1 which is 2,4-diamino-6-[(m-chlorobenzyl)nitrosamino]quinazoline.

4. A compound according to claim 1 which is 2,4-diamino-6-[(3,4-dichlorobenzyl)nitrosamino]quinazoline.

5. A compound according to claim 1 which is a pharmaceutically-acceptable acid-addition salt of 2,4-diamino-6-[(3,4-dichlorobenzyl)nitrosamino]quinazoline.

6. A compound according to claim 5 which is an acetate salt.

References Cited

UNITED STATES PATENTS 3,324,122   6/1967   Burch _____ 260—256.4Q

ALEX MAZEL, Primary Examiner

R. J. GALLAGHER, Assistant Examiner

U.S. Cl. X.R.

260—240, 256.5; 424—200, 232, 251